(12) United States Patent
Liu et al.

(10) Patent No.: US 7,454,339 B2
(45) Date of Patent: Nov. 18, 2008

(54) DISCRIMINATIVE TRAINING FOR SPEAKER AND SPEECH VERIFICATION

(75) Inventors: Chaojun Liu, San Jose, CA (US); David Kryze, Santa Barbara, CA (US); Luca Rigazio, Santa Barbara, CA (US)

(73) Assignee: Panasonic Corporation, Osaka (JP)

( * ) Notice: Subject to any disclaimer, the term of this patent is extended or adjusted under 35 U.S.C. 154(b) by 552 days.

(21) Appl. No.: 11/312,981

(22) Filed: Dec. 20, 2005

(65) Prior Publication Data

US 2007/0143109 A1    Jun. 21, 2007

(51) Int. Cl.
  G10L 15/06    (2006.01)
  G10L 17/00    (2006.01)
(52) U.S. Cl. .................. 704/250; 704/239; 704/246
(58) Field of Classification Search ............... None
  See application file for complete search history.

(56) References Cited

U.S. PATENT DOCUMENTS 5,579,436 A  * 11/1996  Chou et al. ................. 704/244
2003/0036904 A1 *  2/2003  Chaudhari et al. .......... 704/250

OTHER PUBLICATIONS

Tamura, S. Iwano, K. Furai, S. "Improvement of audio-visual speech recognition in cars" in Proceedings of the 18th International Congress on Acoustics (ICA '04), vol. 4, pp. 2595-2598, Kyoto, Japan, Apr. 2004.*
Wilcox, L. Chen, F. Kimber, D. Balasubramanian, V. "Segmentation of speech using speaker identification" Acoustics, Speech, and Signal Processing, 1994. ICASSP-94., 1994 IEEE International Conference on, vol. i, On pp. I/161-I/164.*
H. Gish, M.-H. Siu, R. Rohlicek, "Segregation of speaker for speech recognition and speaker identification," icassp, pp. 873-876, Acoustics, Speech, and Signal Processing, 1991. ICASSP-91., 1991 International Conference on, 1991.*
J. Navratil, U.V. Chaudhari, G.N. Ramaswamy, "Speaker verification using target and background dependent linear transforms and multi-system fusion," Proc. of Eurospeech-01, Aalborg, Denmark, Sep. 2001.*

(Continued)

*Primary Examiner*—David R Hudspeth
*Assistant Examiner*—Matthew J. Sked
(74) *Attorney, Agent, or Firm*—Harness, Dickey & Pierce, PLC

(57) ABSTRACT

A method for discriminatively training acoustic models is provided for automated speaker verification (SV) and speech (or utterance) verification (UV) systems. The method includes: defining a likelihood ratio for a given speech segment, whose speaker identity (for SV system) or linguist identity (for UV system) is known, using a corresponding acoustic model, and an alternative acoustic model which represents all other speakers (in SV) or all other linguist identities (in UV); determining an average likelihood ratio score for the likelihood ratio scores over a set of training utterances (referred to as true data set) whose speaker identities (for SV) or linguist identities (for UV) are the same; determining an average likelihood ratio score for the likelihood ratio scores over a competing set of training utterances which excludes the speech data in the true data set (referred to as competing data set); and optimizing a difference between the average likelihood ratio score over the true data set and the average likelihood ratio score over the competing data set, thereby improving the acoustic model.

15 Claims, 2 Drawing Sheets

OTHER PUBLICATIONS

Sukkar et al, "Utterance Verification of Keyword Strings Using Word-Based Minimum Verification Error (WB-MVE) Training", Proc. ICASSP'96, Atlanta May 1996.

Rosenberg et al, "Speaker Verification Using Minimum verificatio Error Training", ICASSP'98, Seattle, May 1998.

* cited by examiner

DISCRIMINATIVE TRAINING FOR SPEAKER AND SPEECH VERIFICATION

FIELD OF THE INVENTION

The present invention relates generally to discriminative model training, more particularly, to an improved method for discriminatively training acoustic models used in verification.

BACKGROUND OF THE INVENTION

Speaker verification (SV) is the process of verifying an unknown speaker whether he/she is the person as claimed. Speech verification or utterance verification (UV) is the process of verifying the claimed content of a spoken utterance (for example, verifying the hypotheses output from an automatic speech recognition system). Both SV and UV technologies have many applications. For example, SV systems can be used in places (e.g. security gates) where access is only allowed to certain registered people. UV systems can be used to enhance speech recognition systems by rejecting non-reliable hypotheses and therefore improve the user interface. Sometimes UV is included as a component of a speech recognition system to verify the hypotheses from the speech recognition process.

Acoustic model training is a very important process in building any speaker verification systems and speech or utterance verification systems. Acoustic model training has been extensively studied over the past two decades and various methods have been proposed.

Maximum likelihood estimation (ML) is the most widely used parametric estimation method for training acoustic models, largely because of its efficiency. ML assumes the parameters of models are fixed but unknown and aims to find the set of parameters that maximizes the likelihood of generating the observed data. ML training criterion attempts to match the models to their corresponding training data to maximize the likelihood.

Although ML is found to be efficient, discriminative training methods have proven to achieve better models. One example of a discriminative training method is Minimum Verification Error (MVE) training. MVE training criterion attempts to adjust model parameters so as to minimize the approximate verification errors on the training data. While the above mention methods have both proven to be effective, discriminative training methods for creating more accurate and more robust models are still being pursued.

SUMMARY OF THE INVENTION

An improved method is provided for discriminatively training acoustic models for an automated speaker verification systems (SV) and speech (or utterance) verification systems (UV). The method includes: defining a likelihood ratio for a given speech segment, whose speaker identity (in the case of speaker verification system) or linguist identity (in the case of utterance verification system) is known, using a corresponding acoustic model (referred to as a true model), and an alternative acoustic model which represents all other speakers (in SV) or all other speech identities (in UV); determining an average likelihood ratio score for the likelihood ratio scores over a set of training utterances whose speaker identities (in SV) or linguist identities (in UV) are the same, and let's refer to it as true data set; determining an average likelihood ratio score for the likelihood ratio over a competing set of training utterances which excludes the speech data in the true data set (also referred to as a competing data set); and optimizing a difference between the average likelihood ratio score over the true data set and the average likelihood ratio score over the competing data set, thereby improving the acoustic model.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF EXEMPLARY EMBODIMENTS

Figure 1:
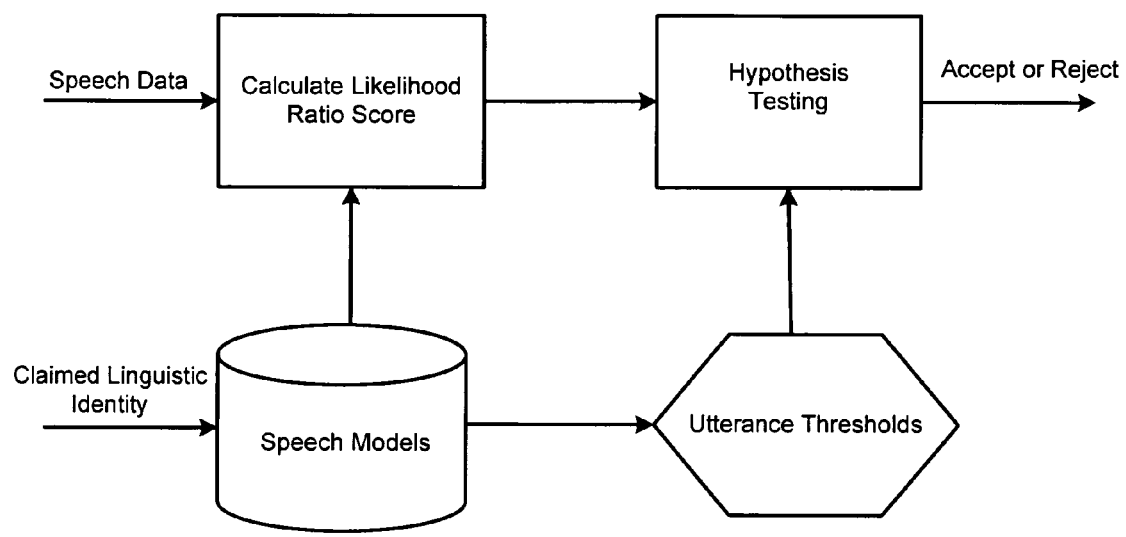
FIG. 1 is a functional block diagram illustrating an exemplary speech verification system.

FIG. 1 illustrates an exemplary speech verification system 10. Given unknown speech data and a claimed linguistic identity (e.g., output from a speech recognizer), a test score (e.g. a likelihood ratio score) is calculated based on corresponding acoustic models. The test score is then compared with a threshold associated with the claimed linguistic identity to decide if the claimed identity should be accepted or rejected.

An improved method is provided for discriminatively training acoustic models used in speech (or utterance) verification systems (UV). For ease of discussion the proposed method will be discussed in the context of speech verification. However, it is readily understood that the described techniques are also applicable to acoustic models used in speaker verification (SV) applications. Thus, the following description is merely exemplary in nature and is not intended to limit the present disclosure, application, or uses.

For a given speech segment X, assume that a speech recognizer recognizes it as word W. Speech (utterance) verification is a post-processing step that examines the reliability of the hypothesized recognition result. Under the framework of statistical hypothesis testing, two complementary hypotheses are proposed, namely the null hypothesis $H_0$ and the alternative hypothesis $H_1$ as follows:

$H_0$: x is a spoken word of W $H_1$: X is NOT a spoken word of W

While the description is provided with reference to a word speech segment, it is readily understood that models intended to verify other types of speech segments, such as phoneme, syllable, phrase, and sentence, are also within the scope of the present invention. Likewise, speaker identification models are also within the scope of the present invention.

The verification process tests the hypotheses $H_0$ against $H_1$ to determine whether to accept the recognition result or reject it. Under some conditions, the optimal method for performing the test is based on a likelihood ratio test (LRT) determined by Neyman-Pearson Lemma, shown mathematically as:

$$LRT(X) = \frac{P(X \mid H_0)}{P(X \mid H_1)} \quad (1)$$

If the likelihood ratio test of X is greater than $\tau$ (i.e., LRT(X)>$\tau$), then $H_0$ is accepted; whereas, if the likelihood ratio test of X is less than $\tau$ (i.e., LRT(X)<$\tau$), then $H_1$ is accepted, where $\tau$ is the decision threshold.

Two key issues affect the performance of such testing. The first is how to determine and collect the appropriate data for $H_0$ and $H_1$. The second is how to accurately calculate $P(X \mid H_0)$ and $P(X \mid H_1)$ given the collected training data. This disclosure focuses on the second issue.

For exemplary purposes, statistical models such as Hidden Markov Models (HMMs) will be used to represent the data for $H_0$ and $H_1$. Thus, the model for $H_0$ is represented as $\lambda_W$ (also referred to as the true model). The corresponding training data set for the true model is named the true data (TD) set $S_T$, where the true data set contains samples of data (e.g., words) for word W. The model for $H_1$ is represented as $\lambda_{\overline{W}}$ (also referred to as an anti-model). The corresponding training data set for the anti-model is named the competing data set (CD) set $S_C$, where the competing data set contains samples of data for words other than the word W. It is envisioned that other types of statistical models are also within the scope of the present invention.

In practice, a log-likelihood ratio test can be used in place of the likelihood ratio test to prevent underflow in machine computation. The log-likelihood ratio test for the true model $\lambda_W$ and the anti-model $\lambda_{\overline{W}}$ is shown mathematically as:

$$LRT(X) = \log \frac{P(X \mid \lambda_W)}{P(X \mid \lambda_{\overline{W}})} = \log P(X \mid \lambda_W) - \log P(X \mid \lambda_{\overline{W}}) \quad (2)$$

In order to more effectively train acoustic models for speaker and/or speech verification, a margin of log likelihood ratio test scores for the true data set and the competing set should be optimized.

Figure 2:
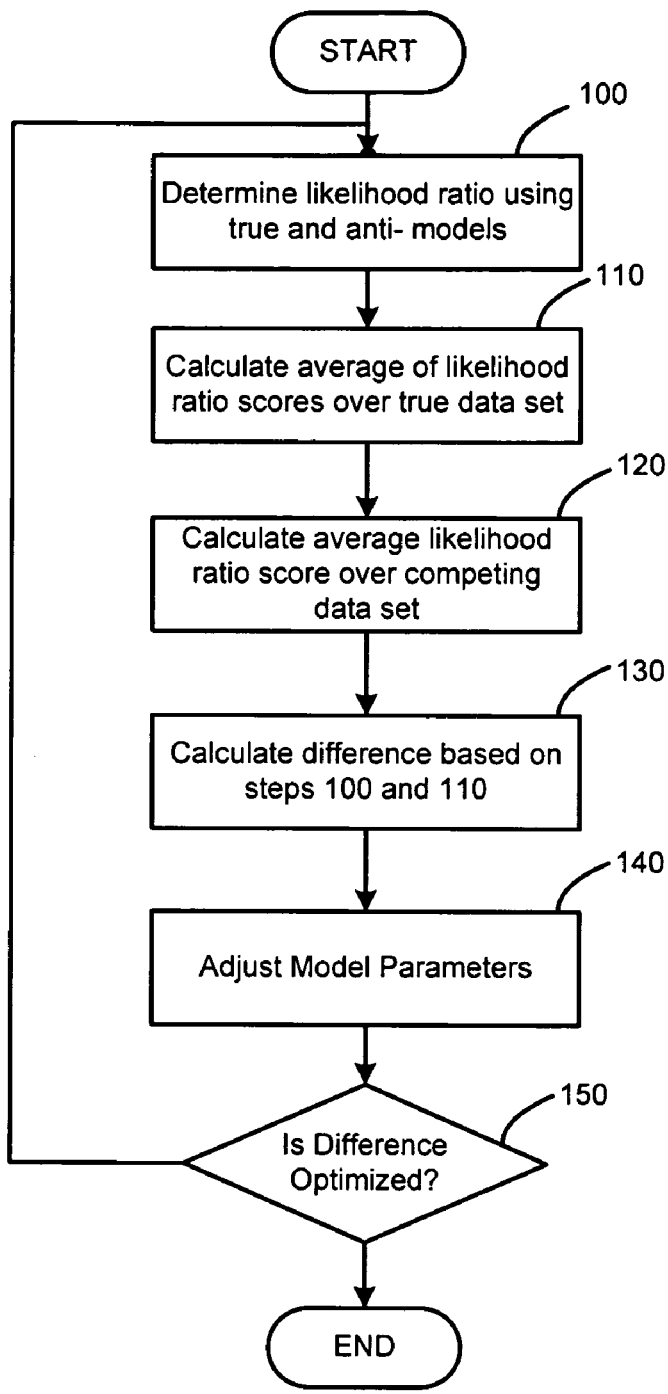
FIG. 2 is a flowchart illustrating the discriminative training method for models used in speaker and speech verification according to the present invention.

FIG. 2 illustrates exemplary steps performed in order to effectively train acoustic models. For every training speech segment X in either true data set or competing data set for word W, a log-likelihood ratio score is determined at 100 using a true acoustic model for word W and an anti-acoustic model which represents words other than word W. An average of log-likelihood ratio scores over the true data set is then determined at 110. In the same way, an average of log-likelihood ratio scores over the competing data set is determined at 120. A difference is determined at 130 based on the two averages and parameters of the models are adjusted at 140. To optimize the difference, the process may be iterative as shown at 150.

In an exemplary embodiment, parameters of the acoustic model are iteratively adjusted in order to maximize the difference between an average of LRT scores over the true data set $S_T$ and an average of LRT scores over the competing data set $S_C$, as shown below:

$$\frac{1}{|S_T|} \sum_{X \in S_T} LRT(X) - \frac{1}{|S_C|} \sum_{X \in S_C} LRT(X) \quad (3)$$

where $|S_T|$ is the size of (i.e., number of utterances in) $S_T$ and $|S_C|$ is the size of $|S_C|$. An objective function $Q(\lambda_W, \lambda_{\overline{W}})$ for equation (3) is defined as follows:

$$Q(\lambda_W, \lambda_{\overline{W}}) = \frac{1}{|S_T|} \sum_{X \in S_T} LRT(X) - \frac{1}{|S_C|} \sum_{X \in S_C} LRT(X) - \theta \quad (4)$$

where $\theta$ is a constant. Substituting the log-likelihood ratio test into this equation provides:

$$= \frac{1}{|S_T|} \sum_{X \in S_C} \{\log P(X \mid \lambda_W) - \log P(X \mid \lambda_{\overline{W}})\} -$$

$$\frac{1}{|S_C|} \sum_{X \in S_C} \{\log P(X \mid \lambda_W) - \log P(X \mid \lambda_{\overline{W}})\} - \theta$$

Using $\Lambda$ to denote the model pair $(\lambda_W, \lambda_{\overline{W}})$, the training criterion is:

$$\Lambda_{opt} = \underset{\Lambda}{\mathrm{argmax}} Q(\Lambda) = \arg \underset{(\lambda_W, \lambda_{\overline{W}})}{\max} Q(\lambda_W, \lambda_{\overline{W}}) \quad (5)$$

Alternatively, parameters of the acoustic models can be iteratively adjusted in order to minimize the difference between an average of LRT scores for the competing data set $S_C$ and an average of LRT scores for the true data set $S_T$, as shown below:

$$\frac{1}{|S_C|} \sum_{X \in S_C} LRT(X) - \frac{1}{|S_T|} \sum_{X \in S_T} LRT(X) \quad (6)$$

An objective function $Q_1(\lambda_W, \lambda_{\overline{W}})$ for this equation may be defined as:

$$Q_1(\Lambda) = Q_1(\lambda_W, \lambda_{\overline{W}}) = -\frac{1}{|S_T|} \sum_{X \in S_T} LRT(X) + \frac{1}{|S_C|} \sum_{X \in S_C} LRT(X) - \theta \quad (7)$$

Substituting the log-likelihood ratio test into this equation provides:

$$= -\frac{1}{|S_T|} \sum_{X \in S_C} \{\log P(X \mid \lambda_W) - \log P(X \mid \lambda_{\overline{W}})\} +$$

$$\frac{1}{|S_C|} \sum_{X \in S_C} \{\log P(X \mid \lambda_W) - \log P(X \mid \lambda_{\overline{W}})\} - \theta$$

Simplified as:

$$= \sum_{x} \alpha \{\log P(X \mid \lambda_W) - \log P(X \mid \lambda_{\overline{W}})\} - \theta \quad (8)$$

-continued $$\alpha = -\frac{1}{|S_T|} \text{ when } X \in S_T;$$

$$\alpha = \frac{1}{|S_C|} \text{ when } X \in S_C$$

In this alternative, parameters of the acoustic models are iteratively adjusted to minimize $Q_1(\lambda_W, \lambda_{\overline{W}})$, so the training criterion is $$\Lambda_{opt} = \underset{\Lambda}{\arg\max} \, Q_1(\Lambda) = \underset{(\lambda_W, \lambda_{\overline{W}})}{\arg\min} \, Q_1(\lambda_W, \lambda_{\overline{W}}) \quad (9)$$

As can be appreciated, the invention contemplates other mathematically equivalent variations of the above stated equations involving the average of LRT scores over the true data set and the competing data set such as:

$$Q_2(\lambda_W, \lambda_{\overline{W}}) = \frac{1}{|S_T| + |S_C|} \left( \sum_{X \in S_T} LRT(X) - \sum_{X \in S_C} LRT(X) \right) - \theta \quad (10)$$

To perform model estimation according to these new training criteria, optimization methods such as the Generalized Probabilistic Descent (GPD) algorithm or Quickprop can be used to iteratively adjust the model parameters to solve the above minimization/maximization problem. It is envisioned that other optimization methods may also be used to solve this problem.

For example, the formula to estimate Gaussian means for the true model and the anti-model (for HMM based acoustic models) based on the training criterion given in equation 9, using the Generalized Probabilistic Descent algorithm, are:

$$\mu_k(n+1) = \mu_k(n+1) - \varepsilon \frac{\partial Q_1(\Lambda)}{\partial \mu_k} \bigg|_{\Lambda = \Lambda_n}$$

$$\overline{\mu}_k(n+1) = \overline{\mu}_k(n+1) - \varepsilon \frac{\partial Q_1(\Lambda)}{\partial \overline{\mu}_k} \bigg|_{\Lambda = \Lambda_n}$$

where $\mu_k(n+1)$ is the k-th Gaussian mean in the true model $\lambda_W$ at (n+1)-th iteration and $\overline{\mu}_k(n+1)$ is the k-th Gaussian mean in the anti-model $\lambda_{\overline{W}}$ at (n+1)-th iteration. $\varepsilon > 0$ is the step size.

As compared to ML training, the proposed discriminative training method has been shown to achieve better models than ML training. As compared to minimum verification error (MVE) training, the proposed discriminative training method directly aims to maximize the difference or margin of the LRT scores for the true data set and the competing data set, while MVE embeds that margin into a sigmoid function to approximate the total verification error count, and then aims to minimize that function. The verification system or classifier built by the proposed training method can be regarded as a type of large margin classifier. According to the machine learning theory, a large margin classifier generally has better robustness, therefore the proposed training method may be able to achieve more robust models than MVE training does.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A method for discriminatively training acoustic models for automated speech verification, comprising:
    defining a likelihood ratio for a given speech segment X having a known linguist identity W, using an acoustic model which represents W and an alternative acoustic model which represents linguist identities other than W;
    determining an average likelihood ratio score for the likelihood ratio scores over a set of training utterances whose linguist identities are the same, W;
    determining an average likelihood ratio score for the likelihood ratio scores over a competing set of training utterances whose linguist identities are not W; and
    optimizing a difference between the average likelihood ratio score over the set of training utterances and the average likelihood ratio score over the competing set of training utterances, thereby improving the acoustic model.

2. The method of claim 1 wherein the acoustic models are further defined as hidden Markov models.

3. The method of claim 1 wherein defining a likelihood ratio further comprises using a log-likelihood ratio test, LTR (X), defined as $$LRT(X) = \log \frac{P(X|\lambda_W)}{P(X|\lambda_{\overline{W}})} = \log P(X|\lambda_W) - \log P(X|\lambda_{\overline{W}})$$

where $\lambda_W$ and $\lambda_{\overline{W}}$ represent the acoustic model and the alternative acoustic model, respectively.

4. The method of claim 3 wherein optimizing a difference further comprises defining a training criterion as $$\Lambda_{opt} = \underset{(\lambda_W, \lambda_{\overline{W}})}{\arg\max} \, Q(\lambda_W, \lambda_{\overline{W}})$$

where $Q(\lambda_W, \lambda_{\overline{W}})$ is defined as $$Q(\lambda_W, \lambda_{\overline{W}}) = \frac{1}{|S_T|} \sum_{X \in S_T} LRT(X) - \frac{1}{|S_C|} \sum_{X \in S_C} LRT(X) - \theta$$

where $S_T$ is the set of training utterances and $S_C$ is the competing set of training utterances.

5. The method of claim 3 wherein optimizing a difference further comprises defining a training criterion as $$\Lambda_{opt} = \underset{(\lambda_W, \lambda_{\overline{W}})}{\arg\max} \, Q_1(\lambda_W, \lambda_{\overline{W}})$$

where $Q_1(\lambda_W, \lambda_{\overline{W}})$ is defined as $$Q_1(\lambda_W, \lambda_{\overline{W}}) = -\frac{1}{|S_T|} \sum_{X \in S_T} LRT(X) + \frac{1}{|S_C|} \sum_{X \in S_C} LRT(X) - \theta$$

where $S_T$ is the set of training utterances and $S_C$ is the competing set of training utterances.

6. The method of claim 5 further comprises solving the training criterion using a generalized probabilistic descent algorithm or a Quickprop optimization algorithm.

7. The method of claim 3 wherein optimizing a difference further comprises defining a training criterion as $$\Lambda_{opt} = \arg\max_{(\lambda_W, \lambda_{\overline{W}})} Q_2(\lambda_W, \lambda_{\overline{W}})$$

where $Q_2(\lambda_W, \lambda_{\overline{W}})$ is defined as $$Q_2(\lambda_W, \lambda_{\overline{W}}) = \frac{1}{|S_T|+|S_C|}\left(\sum_{X \in S_T} LRT(X) - \sum_{X \in S_C} LRT(X)\right) - \theta$$

where $S_T$ is the set of training utterances and $S_C$ is the competing set of training utterances.

8. The method of claim 1 wherein optimizing a difference further comprises maximizing the difference by iteratively adjusting parameters of the acoustic models.

9. A method for discriminatively training acoustic models for automated speaker verification, comprising:
   defining a likelihood ratio for a given speech segment X having a known speaker identity, K, using an acoustic model which represents K and an alternative acoustic model which represents speakers other than K;
   determining an average likelihood ratio score for the likelihood ratio scores over a set of training utterances which are spoken by speaker K;
   determining an average likelihood ratio score for the likelihood ratio scores over a competing set of training utterances which are spoken by speakers other than speaker K; and
   optimizing a difference between the average likelihood ratio score over the set of training utterances and the average likelihood ratio score over the competing set of training utterances, thereby improving the acoustic model.

10. The method of claim 9 wherein defining a likelihood ratio further comprises using a log-likelihood ratio test, LRT (X) defined as $$LRT(X) = \log\frac{P(X|\lambda_K)}{P(X|\lambda_{\overline{K}})} = \log P(X|\lambda_K) - \log P(X|\lambda_{\overline{K}})$$

where $\lambda_K$ and $\lambda_{\overline{K}}$ represent the acoustic model and the alternative acoustic model, respectively.

11. The method of claim 10 wherein optimizing a difference further comprises defining a training criterion as $$\Lambda_{opt} = \arg\max_{(\lambda_K, \lambda_{\overline{K}})} Q(\lambda_K, \lambda_{\overline{K}})$$

where $Q(\lambda_K, \lambda_{\overline{K}})$ is defined as $$Q(\lambda_K, \lambda_{\overline{K}}) = \frac{1}{|S_T|}\sum_{X \in S_T} LRT(X) - \frac{1}{|S_C|}\sum_{X \in S_C} LRT(X) - \theta$$

where $S_T$ is the set of training utterances and $S_C$ is the competing set of training utterances.

12. The method of claim 10 wherein optimizing a difference further comprises defining a training criterion as $$\Lambda_{opt} = \arg\min_{(\lambda_K, \lambda_{\overline{K}})} Q(\lambda_K, \lambda_{\overline{K}})$$

where $Q(\lambda_K, \lambda_{\overline{K}})$ is defined as $$Q(\lambda_K, \lambda_{\overline{K}}) = -\frac{1}{|S_T|}\sum_{X \in S_T} LRT(X) + \frac{1}{|S_C|}\sum_{X \in S_C} LRT(X) - \theta$$

where $S_T$ is the set of training utterances and $S_C$ is the competing set of training utterances.

13. The method of claim 12 further comprises solving the training criterion using a generalized probabilistic descent algorithm or a Quickprop optimization algorithm.

14. The method of claim 10 wherein optimizing a difference further comprises defining a training criterion as $$\Lambda_{opt} = \arg\min_{(\lambda_K, \lambda_{\overline{K}})} Q_2(\lambda_K, \lambda_{\overline{K}})$$

where $Q_2(\lambda_K, \lambda_{\overline{K}})$ is defined as $$Q_2(\lambda_K, \lambda_{\overline{K}}) = \frac{1}{|S_T|+|S_C|}\left(\sum_{X \in S_T} LRT(X) - \sum_{X \in S_C} LRT(X)\right) - \theta$$

where $S_T$ is the set of training utterances and $S_C$ is the competing set of training utterances.

15. The method of claim 9 wherein optimizing a difference further comprises maximizing the difference by iteratively adjusting parameters of the acoustic model.

* * * * *

UNITED STATES PATENT AND TRADEMARK OFFICE
CERTIFICATE OF CORRECTION

PATENT NO.       : 7,454,339 B2
APPLICATION NO.  : 11/312981
DATED            : November 18, 2008
INVENTOR(S)      : Chaojun Liu et al.

It is certified that error appears in the above-identified patent and that said Letters Patent is hereby corrected as shown below:

Column 6, Line 27, Claims 3:
"LTR" should be --LRT--

Column 6, Line 57, Claim 5:
"arg max" should be --arg min--

Column 8, Line 39, Claim 14:
"arg min" should be --arg max--

Signed and Sealed this

Twenty-fourth Day of February, 2009

JOHN DOLL
*Acting Director of the United States Patent and Trademark Office*